Jan. 18, 1949.  E. G. ASHCRAFT  2,459,210
VARIABLE DIFFERENTIAL TRANSFORMER
Filed July 21, 1944
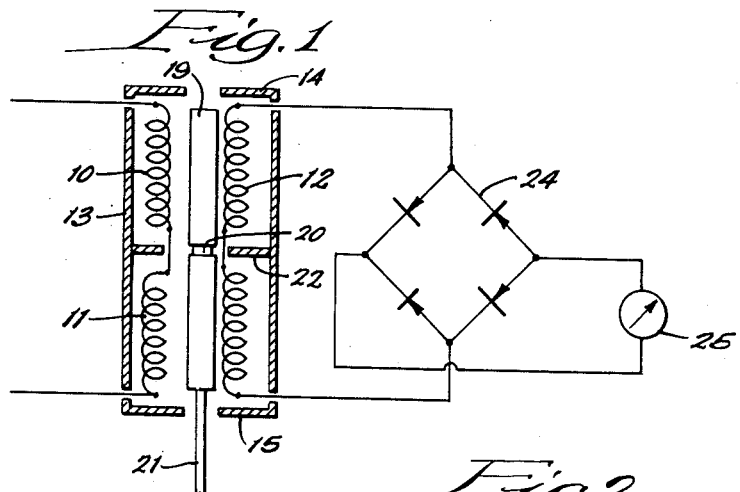
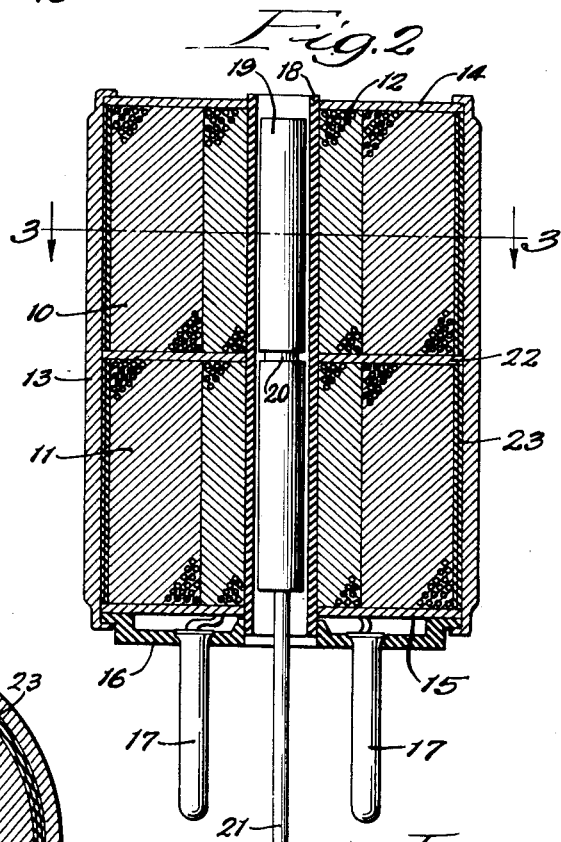
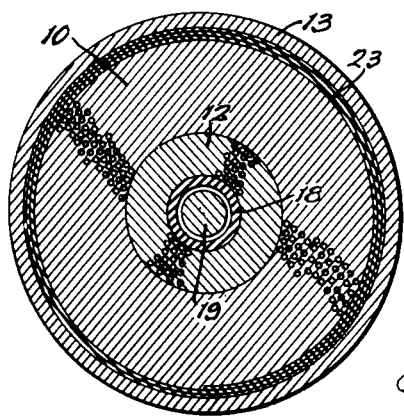
Inventor:
Ernest G. Ashcraft,
By Dawson, Ooms and Booth,
Attorneys.

Patented Jan. 18, 1949

2,459,210

UNITED STATES PATENT OFFICE 2,459,210

VARIABLE DIFFERENTIAL TRANSFORMER

Ernest G. Ashcraft, Chicago, Ill.

Application July 21, 1944, Serial No. 546,031

3 Claims. (Cl. 171—119)

This invention relates to electric translating device and more particularly to an electrical unit for producing changes in an electrical force in response to mechanical movements.

One of the objects of the invention is to provide a device which is compact, easily installed and highly efficient in operation.

Another object of the invention is to provide an electric translating device in which mechanical movements cause linearly related changes in an electrical force.

Still another object of the invention is to provide an electric translating device in which changes in the electric force are produced by oppositely varying air gaps in related magnetic paths.

A still further object of the invention is to provide an electric translating device which produces a sharp zero position.

The above and other objects and advantages will be more readily apparent from the following description when read in connection with the accompanying drawing, in which—

Figure 1 is a circuit diagram of a device embodying the invention;

Figure 2 is an enlarged axial section of the device; and

Figure 3 is a transverse section on the line 3—3 of Figure 2.

The device as shown, comprises two windings inductively related, one of which includes two substantially identical sections 10 and 11 which are oppositely wound connected in series, and spaced axially of each other. The second winding 12 is a continuous winding which is coextensive in length with the sections 10 and 11. As best seen in Figures 2 and 3, the several windings are preferably tubular to provide an axial central opening.

The windings are enclosed in a magnetic casing 13 which is generally cylindrical in shape. A thin end plate 14 of magnetic material is connected to one end of the casing 13 and overlies one end of the winding to provide a magnetic pole at said end of the winding. A similar plate 15 overlies the opposite end of the winding and is held in place by an insulating disc 16 secured to the end of the casing 13. The disc 16 carries a plurality of connector prongs 17 by which the unit may be supported and connected in circuit simply by plugging the prongs into a socket. Preferably an insulating sleeve 18 is secured in the opening thru the windings and extends thru the end plates 14 and 15 for structural purposes.

A core of magnetic material 19 is movably mounted in the sleeve 18 to move axially thru the opening in the windings. The core may be moved thru any desired mechanism by means of a positioned element which in the present embodiment is a non-magnetic rod 21 connected to one end of the core. By moving the core the magnetic coupling between the sections 10 and 11 of the first winding and the second winding 12 is varied. According to the present invention this is accomplished by making the core slightly shorter than the distance between the end plates 14 and 15 to leave air gaps at the opposite ends of the core. When the core is in its central position the coupling between the second winding 12 and the sections of the first winding is the same. Therefore, the oppositely wound sections of the first winding have an equal effect on the second winding and the output of the unit is zero. As the core is moved in one direction or the other, one of the air gaps is increased while the other is decreased so that the coupling is varied to produce an indication in the output circuit of the device.

In addition to providing substantially closed magnetic paths of relatively low reluctance, the casing and core also serve to minimize leakage flux and to shield the device from external magnetic fields. Thus the unit of the present invention can be used relatively close to other electrical devices without affecting or being affected by them.

In order to separate the magnetic fields produced by the opposed windings 10 and 11 to obtain an output, varying according to a straight line in either direction of movement of the core, there is provided according to the present invention a relatively thin magnetic spacer 22 separating the sections 10 and 11 of the first winding and dividing the winding 12. This magnetic spacer engages the casing 13 and is inductively related to the core 19 to provide two substantially separate magnetic paths. With this construction the operating curve of the instrument is substantially a sharp V with straight legs meeting at a sharp juncture in the center. The sharpness of the zero position may be further increased by reducing the core section at a point opposite the spacer 22 when the core is in its neutral position. As shown, the core may be formed with an annular notch or circumferential groove 20 about its mid-section, the notch lying opposite the spacer 22 when the core is centralized.

To insure a tight connection between the end plates, the spacer and the casing, relatively thin resilient strips of magnetic material 23 are wound around the coil sections separated by the spacer 22 with their ends in engagement with the spacer and the respective end plates. When the device is assembled these strips are wound around the coils in engagement with the spacer and the end plates. The casing 13 may thereafter be slipped over the windings and strips and its ends may be spun over the end plates and insulating disc 16 as shown. In the event of any inaccuracies in forming the end plates or spacer, the strips 23 insure a permanently non-varying magnetic connection between the end plates, the spacer and the casing.

In operation, either of the windings may be utilized as the primary, but I prefer to connect the unit as shown diagrammatically in Figure 1 with the winding sections 10 and 11 in series as the primary winding. The opposite ends of this winding may be connected to any available source of alternating current and the winding 12 which forms the secondary may be connected thru a rectifier 24 to a direct current meter 25 such as a milliammeter. With the core in its central position, the winding sections 10 and 11 will produce equal and opposite fluxes which are divided by the spacer 22 and flow thru the opposite ends of the casing 13. These fluxes will have equal and opposed effects on the winding 12 and its output will be zero.

As the core is moved longitudinally the air gap between one of its ends and one of the end plates 14 and 15 is increased while the air gap at the opposite end is decreased. The balance between the magnetic reluctances of the two flux paths is therefore upset, causing an increase in flux density at one end of the casing and a decrease in flux density at the other end of the casing. Te coupling of one of the coil sections 10 or 11 to winding 12 accordingly increases while the coupling of the other section decreases with the result that a voltage will be induced in the coil 12 whose polarity and magnitude depend upon which of the coil sections becomes more tightly coupled and to what extent.

It will be observed that variation of a single air gap in a magnetic core coupling two windings produces a generally hyperbolic change in the degree of coupling relative to changes in the air gap. By the present invention two air gaps are provided in related magnetic paths, one of which increases at exactly the same rate as the other decreases. The coupling between one of the coil sections 10 and 11 and the winding 12 therefore increases according to one hyperbolic curve while the coupling between the other coil section and the winding is decreasing according to a similar hyperbolic curve. The result is that the effects of the two coil sections on the winding 12 combine according to the sum of the changes in couplings to produce a substantially linear relationship between movement of the core and net change in coupling on the winding 12. Accordingly a voltage will be induced in the winding 12 which is directly proportional to the amount of displacement of the core. With this construction a meter can be used at 25 which has a linear scale and which can easily be calibrated and adjusted without special matching with a particular translator unit.

It will be understood that the device of the present invention could be used in many different types of circuits and that the circuit shown in Figure 1 is intended only as one illustrative example. Various other changes might also be made in the construction of the device and the embodiment illustrated and described is intended to be illustrative and not as a definition of the scope of the invention, reference being had for this purpose to the appended claims.

What is claimed is:

1. An electric translating device comprising a first winding having a pair of oppositely wound tubular sections connected in series and mounted coaxially end to end, a second tubular winding coaxial with said sections, a magnetic frame inductively related to the windings and terminating in magnetic poles at the ends of the windings, an annular magnetic spacer separating the sections of the first winding and dividing the second winding and inductively related to the frame, and a magnetic core having a circumferential groove and movable in the opening through the windings, said core being shorter than the distance between said poles, said spacer and groove being in general alinement and of substantially the same axial dimension.

2. An electric translating device comprising a first winding having a pair of oppositely wound tubular sections connected in series and mounted coaxially end to end, a second tubular winding coaxial with said sections, a tubular casing of magnetic material enclosing the winding, annular end plates on the casing overlying the ends of the windings, a thin magnetic spacer separating the sections of the first winding and dividing the second winding and inductively related to the casing, and a magnetic core having a narrow circumferential groove about its mid section and movable axially in the opening through the windings, said groove and said magnetic spacer being of substantially the same axial dimension and in register with one another when said movable core is axially centered with respect to said tubular winding.

3. An electric translating device comprising a pair of primary windings in the form of tubular sections connected in series and mounted coaxially end to end, a pair of series-connected secondary windings in the form of tubular sections coaxial with said primary windings, individual sections of said secondary winding being in closely coupled engagement with respective ones of the sections of said primary winding, a tubular casing of magnetic material enclosing the windings, annular end plates on the casing overlying the ends of the windings, an annular magnetic spacer located centrally in said casing and separating the sections of the primary and secondary windings, and a magnetic core having a circumferential groove about its mid section, said core being shorter than the distance between said end plates and said magnetic spacer having substantially the same axial thickness as said circumferential groove, one of said winding sections being reversely wound so that the voltage produced by said secondary winding varies sharply as the groove in said core is moved in either direction from its position of alinement with respect to said annular spacer.

ERNEST G. ASHCRAFT.

REFERENCES CITED

The following references are of record in the file of this patent:

UNITED STATES PATENTS

| Number | Name | Date |
|---|---|---|
| 2,050,629 | Quereau et al. | Aug. 11, 1936 |
| 2,230,945 | Hansell | Feb. 4, 1941 |
| 2,313,989 | Calewell et al. | Mar. 16, 1943 |
| 2,354,365 | Crossley | July 25, 1944 |